United States Patent Office 3,094,458
Patented June 18, 1963

3,094,458
2,2,3,3-TETRACHLORO-1,4-BUTANEDIOL
CYCLIC ACID PHOSPHATE
Max E. Chiddix and Robert W. Wynn, Easton, Pa., assignors to General Aniline & Film Corporation, New York, N.Y., a corporation of Delaware
No Drawing. Filed Jan. 5, 1961, Ser. No. 80,740
5 Claims. (Cl. 167—33)

This invention relates to the cyclic acid phosphate of 2,2,3,3-tetrachloro-1,4-butanediol, its preparation and its use as a plant fungicide.

It is an object of this invention to provide 2,2,3,3-tetrachloro-1,4-butanediol cyclic acid phosphate as a new composition of matter, to provide a method for its preparation and to provide a method for combatting fungus therewith on growing plants.

In accordance with our invention, 2,2,3,3-tetrachloro-1,4-butanediol cyclic acid phosphate having the formula

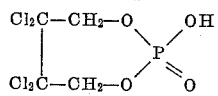

is prepared by heating an approximately equimolecular mixture of POCl₃ and 2,2,3,3-tetrachloro-1,4-butanediol (prepared by adding chlorine to 2-butynediol-1,4-diacetate and hydrolyzing the diester) in an inert high boiling organic solvent while removing evolved HCl from the mixture, and hydrolyzing the residual phosphorus-borne chlorine in the resulting reaction mixture, preferably by adding water thereto and heating while removing evolved HCl. The cyclic acid phosphate ester having the formula indicated above can be separated from the resulting solution by evaporation of the solvent or—if its solubility characteristics permit—cooling the solution to effect precipitation of the ester and recovering the latter in solid form by filtration.

We have found that the aforesaid new compound has valuable properties as a plant fungicide e.g. for combatting late blight (*Phytophthora infestans*) on tomato plants.

Our invention will be more fully understood from the following examples wherein parts and percentages are by weight, unless otherwise indicated.

Example 1

45.6 parts (0.2 mol) of 2,2,3,3-tetrachloro-1,4-butanediol and 30.7 parts (0.2 mol) of POCl₃ were added to 260 parts of o-dichlorobenzene, and the solution was heated gradually to a temperature of 165° C., while passing a stream of nitrogen through the mixture. The evolved HCl was absorbed in water and measured by titration with caustic alkali. When the amount collected exceeded 0.4 mol parts (i.e. 2 molecular equivalents per mol part of whichever reagent is present in the lesser molar proportion, in case either is present in excess), the mixture was cooled to 40° C. and 3.6 (0.2 mol) part of water were added. The mixture was again heated gradually to 165° C., and the evolved HCl was absorbed as before in water. The total quantity of HCl evolved and absorbed in this manner was found by titration to be 0.589 mol part. The reaction mixture was cooled to room temperature and the resulting precipitate filtered off and dried. The product thus obtained as an amorphous water-soluble solid was recovered in a yield of 51.1 parts. Analysis indicated it to contain 10.19% P and 49.04% Cl (theory for C₄H₅O₄PCl₄: 10.07% P, 49.0% Cl).

Example 2

Tomtato plants 4 to 5 inches high were sprayed with an aqueous solution of the product obtained in the preceding example, in a concentration of 1,000 parts per million until the foliage was wet to the point of run-off. As a control, other tomato plants were sprayed similarly with water. All of the plants were allowed to dry and then sprayed with a homogenized slurry of the mycelia of *Phytophthora infestans* (late blight fungus) previously grown on wheat seeds. The plants were incubated 48 hours at 72° F. and 100% humidity, and then placed in a shadehouse greenhouse for 48 hours. Comparison was then made of the number of lesions on 11 leaflets of the 3 top leaves of each plant—absence of more than 5 lesions per plant indicating excellent control of the fungus, while plants having no fungicide contained in excess of 25 lesions per plant. The fungicidal effect of spraying the plants with 2,2,3,3-tetrachloro-1,4-butanediol cyclic acid phosphates at a concentration of 1,000 p.p.m. was found to be excellent.

In carrying out the process for preparing the novel compound of this invention, other inert solvents such as nitrobenzene or dichlorotoluene can be substituted for dichlorobenzene. Preferably the solvent used has a boiling point above 160° C.

The reagents are advantageously employed in substantially equimolecular proportions, i.e. any excess of either reagent being preferably limited to not more than 10%. The proportion of the solvent to the reagents is not critical, but in general, an amount of solvent 2 to 5 times the combined amounts of the reagents is satisfactory.

The heating of the reaction mixture is advantageously adjusted to afford smooth but rapid evolution of HCl. Thus, the temperature is gradually raised from room temperature to a final temperature within the range 150 to 175° C.—in the initial stage of the reaction, as well as in the final hydrolysis.

The quantity of water employed for hydrolysis advantageously approximates the molecular equivalent of the phosphorus oxychloride employed. An excess may be used, but the amount is preferably limited as indicated to minimize retention of HCl by the reaction mixture during the hydrolysis. Measurement of the quantity of HCl evolved by the reaction mixture offers a convenient method of following the course of the reaction and determining when it is complete.

In employing 2,2,3,3-tetrachloro-1,4-butanediol cyclic acid phosphate as a fungicide, the product is advantageously dissolved in water at a concentration of 0.01 to 0.2% and the solution sprayed on the leaves of the plant to be protected or treated until the surfaces thereof are thoroughly covered. Advantageously a small amount (i.e. 0.1%) of a nonionic or anionic wetting agent can be included in the solution, as for example, sodium lauryl sulfate or polyethoxylated nonylphenol.

Variations and modifications which will be obvious to those skilled in the art can be made in the procedures described above without departing from the spirit or scope of the invention.

We claim:

1. A process for the preparation of 2,2,3,3-tetrachloro-1,4-butanediol cyclic acid phosphate, which comprises heating 2,2,3,3-tetrachloro-1,4-butanediol with a substantially equimolecular amount of phosphorus oxychloride in an inert organic high boiling solvent while removing evolved HCl, cooling and adding water to the resulting mixture, and again heating while removing evolved HCl.

2. A process for the preparation of 2,2,3,3-tetrachloro-1,4-butanediol cyclic acid phosphate, which comprises gradually heating 2,2,3,3-tetrachloro-1,4-butanediol with a substantially equimolecular amount of phosphorus oxychloride in an inert organic solvent having a boiling point of at least 160° C., to a temperature of 150 to 175° C., removing evolved HCl from the reaction mixture, cooling, adding water in an amount substantially the molecular equivalent of the quantity of phosphorus oxychloride, and heating gradually to the aforesaid temperature range while removing evolved HCl.

3. The process defined in claim 2 wherein the initial heating is continued until the HCl evolved amounts to at least 2 mols per mol of the reagent present in minor molecular amount, and the second heating step is carried out until the total amount of evolved HCl amounts to substantially 3 mols per mol of 2,2,3,3-tetrachloro-1,4-butanediol.

4. As a new composition of matter, 2,2,3,3-tetrachloro-1,4-butanediol cyclic acid phosphate having the formula

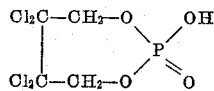

5. The method of combatting plant fungus which comprises spraying the foliage of a plant with an aqueous solution containing from 0.01 to 0.2% of 2,2,3,3-tetrachloro-1,4-butanediol cyclic acid phosphate.

References Cited in the file of this patent

UNITED STATES PATENTS

| | | |
|---|---|---|
| 2,389,576 | Kosolapoff | Nov. 20, 1945 |
| 2,486,657 | Kosolapoff | Nov. 1, 1949 |
| 2,613,221 | Ladd et al. | Oct. 7, 1952 |
| 2,661,365 | Gamrath et al. | Dec. 1, 1953 |

OTHER REFERENCES

Khorana et al.: "J. Am. Chem. Soc." 79, pages 430–436 (1957).